United States Patent [19]

Uban

[11] Patent Number: 4,994,190
[45] Date of Patent: Feb. 19, 1991

[54] SERIAL CROSSFLOW FILTRATION ASSEMBLY

[75] Inventor: Stephen A. Uban, Stillwater, Minn.

[73] Assignee: CPC Engineering Corporation, Sturbridge, Mass.

[21] Appl. No.: 478,149

[22] Filed: Jan. 30, 1990

[51] Int. Cl.$^5$ .................... B01D 61/14; B01D 61/18
[52] U.S. Cl. ................. 210/650; 210/195.2; 210/257.2; 210/321.6
[58] Field of Search ............. 210/195.2, 257.2, 321.6, 210/321.72, 634, 632, 641, 644, 649–657, 321.65, 321.64

[56] References Cited

U.S. PATENT DOCUMENTS

| | | |
|---|---|---|
| 3,856,569 | 12/1974 | Strong . |
| 4,062,771 | 12/1977 | Saupe . |
| 4,198,293 | 4/1980 | Ogawa et al. . |
| 4,255,255 | 3/1981 | Ogawa et al. . |
| 4,670,150 | 6/1987 | Hsuing et al. ............... 210/637 |
| 4,702,842 | 10/1987 | Lapierre . |
| 4,717,425 | 1/1988 | Lefebvre . |
| 4,724,080 | 2/1988 | Dau et al. . |

Primary Examiner—Frank Sever
Attorney, Agent, or Firm—Finnegan, Henderson, Farabow, Garrett and Dunner

[57] ABSTRACT

A crossflow filtration assembly includes a plurality of crossflow filtration modules connected in series, a pump for introducing a solution containing large components and small components, and a pump for circulating the solution between the series-connected modules. Each module has an inlet for receiving the large and small components in solution, a semipermeable membrane for passing only the small particles in solution to be discharged from the assembly, and an outlet for passing the large components in solution to be circulated to the inlet of the next series-connected module. Prior to entering the next series-connected module, the large components in solution are diluted by incoming solution.

16 Claims, 7 Drawing Sheets

SERIAL CROSSFLOW FILTRATION ASSEMBLY

FIELD OF THE INVENTION

The present invention relates to a filtration assembly, and more particularly to a serial crossflow filtration assembly.

DESCRIPTION OF THE RELATED ART

In crossflow filtration, a filterable solution is flowed along the surface of a permeable membrane housed in a filter module. Smaller components of the solution pass through pores in the membrane, while components too large to pass through the membrane continue through the module.

A conventional crossflow filtration assembly is shown in FIG. 1. An influent solution 120, comprising large and small components 121 and 122 respectively in a liquid solution, enters the assembly at system inlet 10. Circulating pump 11 pumps influent solution 120 and its components 121 and 122 through line 12 to filter inlet 13, where it enters a cross flow filtration module 14. In filtration module 14, small components 122 pass through a membrane 15 to product outlet 16, thus exiting the assembly via product outlet line 17. Meanwhile, large components 121 continue to flow through filter module 14 to be discharged through recycle outlet 18 to recycle line 19. From this point, the larger components 121 in solution are returned to circulating pump 11.

During operation of this crossflow filtration assembly, as small components 122 and liquid are removed from the system, a concentration of larger components 121 in solution 120 increases. Solution 120 thus assumes characteristics of a heavy brine or sludge. A problem can develop when a heavy concentration of larger components 121 collects in the filtration module 14, and reduces or obstructs flow through the module.

To correct this shortcoming, the length of filtration module 14 was reduced, so the larger components 121 would exit the module without restricting flow. However, this resulted in reduced exposure of the solution to the filter and reduced both filtering capacity of filtration module 14 and the efficiency of the entire assembly.

To increase capacity, a plurality of filtration modules 14 were arranged in parallel as shown in FIG. 2. This configuration has an additional drawback. If four modules are arranged in parallel, then the power and flow output of circulating pump 11 needs to be increased by a factor of four to maintain the same flow rate of solution 120 through each module 14. Also, the system piping size and valve size must increase, resulting in head loss throughout the system.

Accordingly, it is an object of the present invention to provide a crossflow filtration assembly which provides increased flow and prevents obstruction of the filtration module.

It is also an object to increase flow without significantly increasing pump capacity or power, and without increasing the size of system piping and valves.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims and their equivalents.

SUMMARY OF THE INVENTION

To achieve the foregoing objects, and in accordance with the purposes of the invention as embodied and broadly described herein, there is provided a crossflow filtration assembly. The assembly includes a plurality of crossflow filtration means for separating a solution into a first set of components and a second set of components. Each of the crossflow filtration means includes at least one crossflow filtration module having an inlet, a first outlet discharging the first set of components, and a second outlet discharging the second set of components. The plurality of crossflow filtration modules are connected in a series configuration wherein each inlet is connected to the preceding first outlet. Means are provided for introducing the solution into the series-connected crossflow filtration modules at each inlet to mix with the first set of components discharged from the preceding first outlet. Means are also provided for circulating the solution and the first set of components in the series-connected crossflow filtration modules.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENTS

Reference will now be made in detail to the present preferred embodiments of the invention as illustrated in the accompanying drawings.

Figure 1:
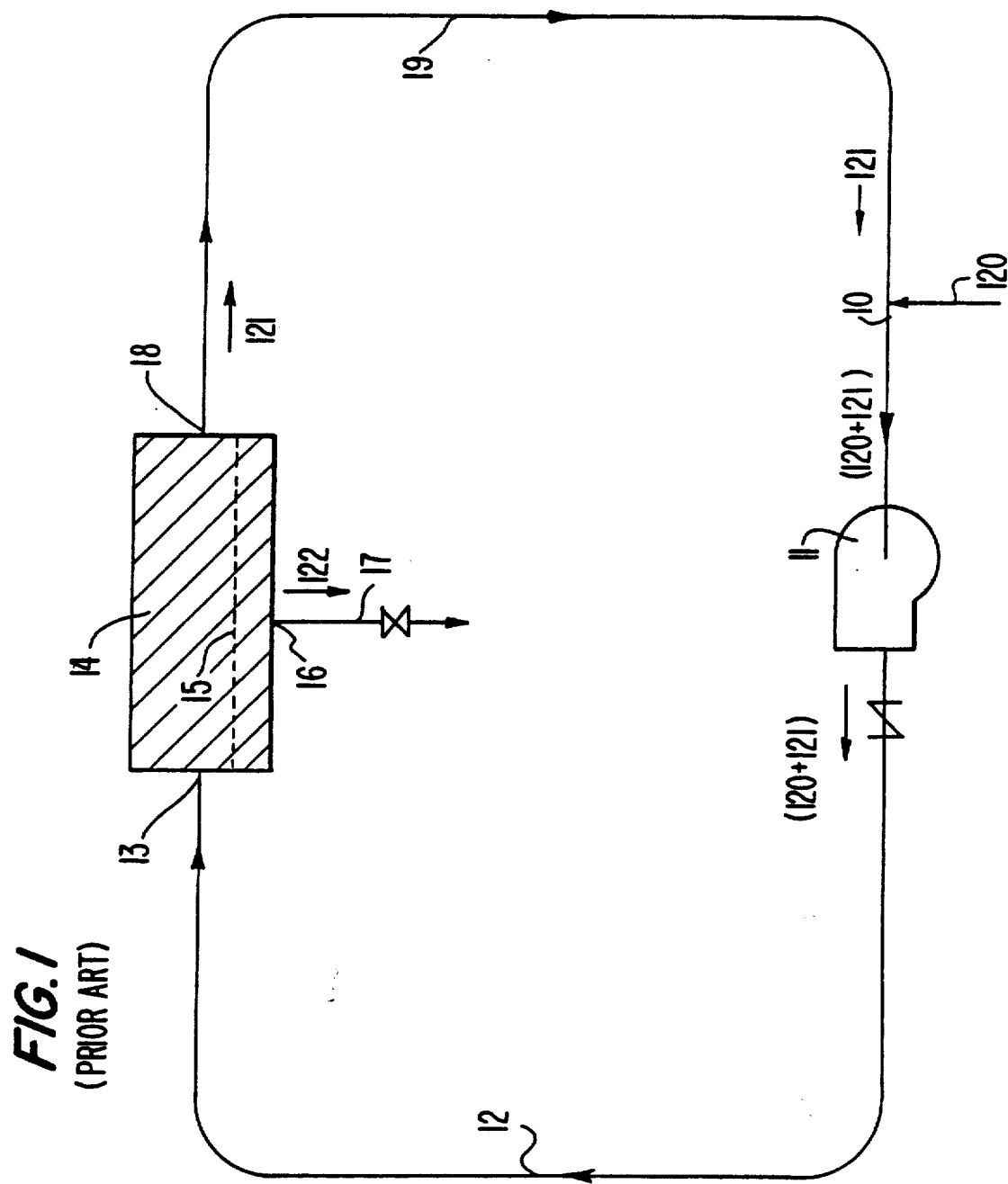
FIG. 1 is a schematic diagram of a conventional crossflow filtration assembly.
Figure 2:
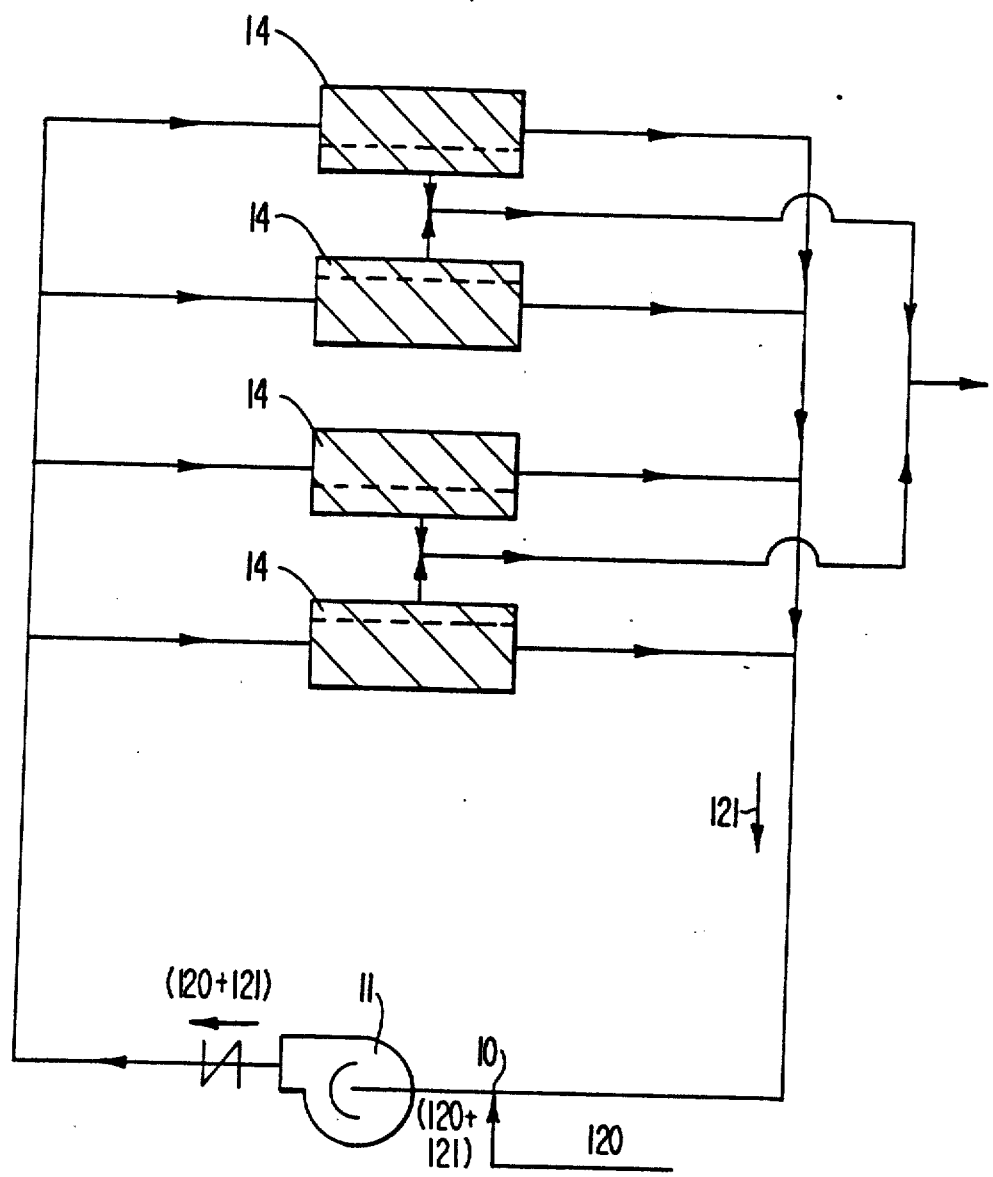
FIG. 2 is a schematic diagram of a conventional modification of the crossflow filtration assembly of FIG. 1, having filtration modules arranged in parallel.
Figure 3:
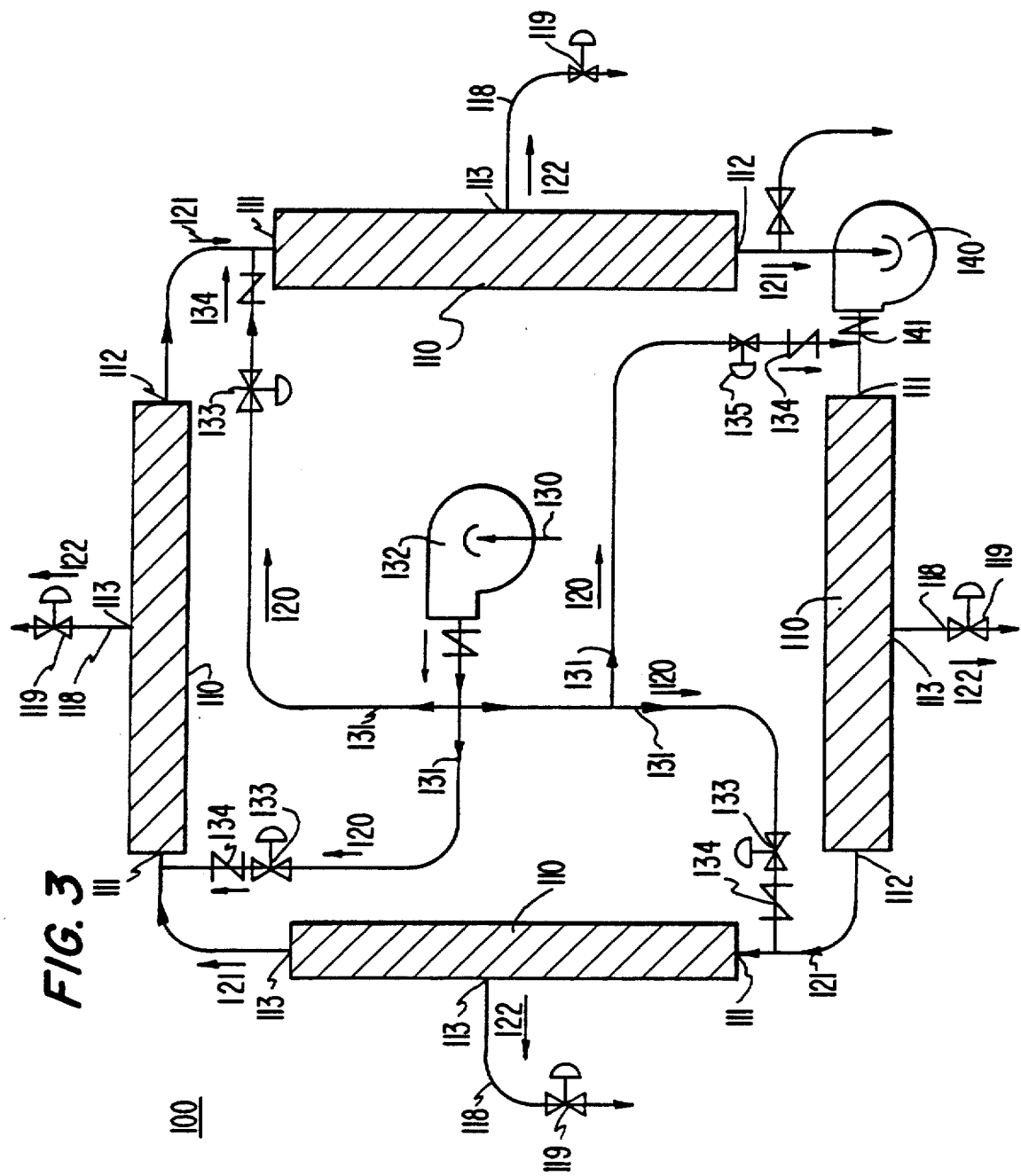
FIG. 3 is a schematic diagram of a first embodiment of a serial crossflow filtration assembly in accordance with the present invention.

A first preferred embodiment of a crossflow filtration assembly according to the teachings of the present invention is shown in FIG. 3 and is designated generally by the numeral 100.

According to the present invention, the crossflow filtration assembly includes a plurality of crossflow filtration means for separating a solution into a first set of components and a second set of components. Each of the filtration means includes at least one module having an inlet, a first outlet discharging the first set of components, and a second outlet discharging the second set of components. The plurality of crossflow filtration means are connected in a series configuration wherein each inlet is connected to the preceding first outlet. As embodied in FIG. 3, the plurality of crossflow filtration means includes a plurality of crossflow filtration modules, each module including an inlet 111, a first outlet 112, a second outlet 113 and a filter membrane 116 (shown in FIG. 4) between the inlet 111 and the second outlet 113. The plurality of crossflow filtration modules 110 are connected in series one to another, with each inlet 111 connected by a length of piping to the preceding first outlet 112, forming an endless series, or circular configuration.

Figure 4:
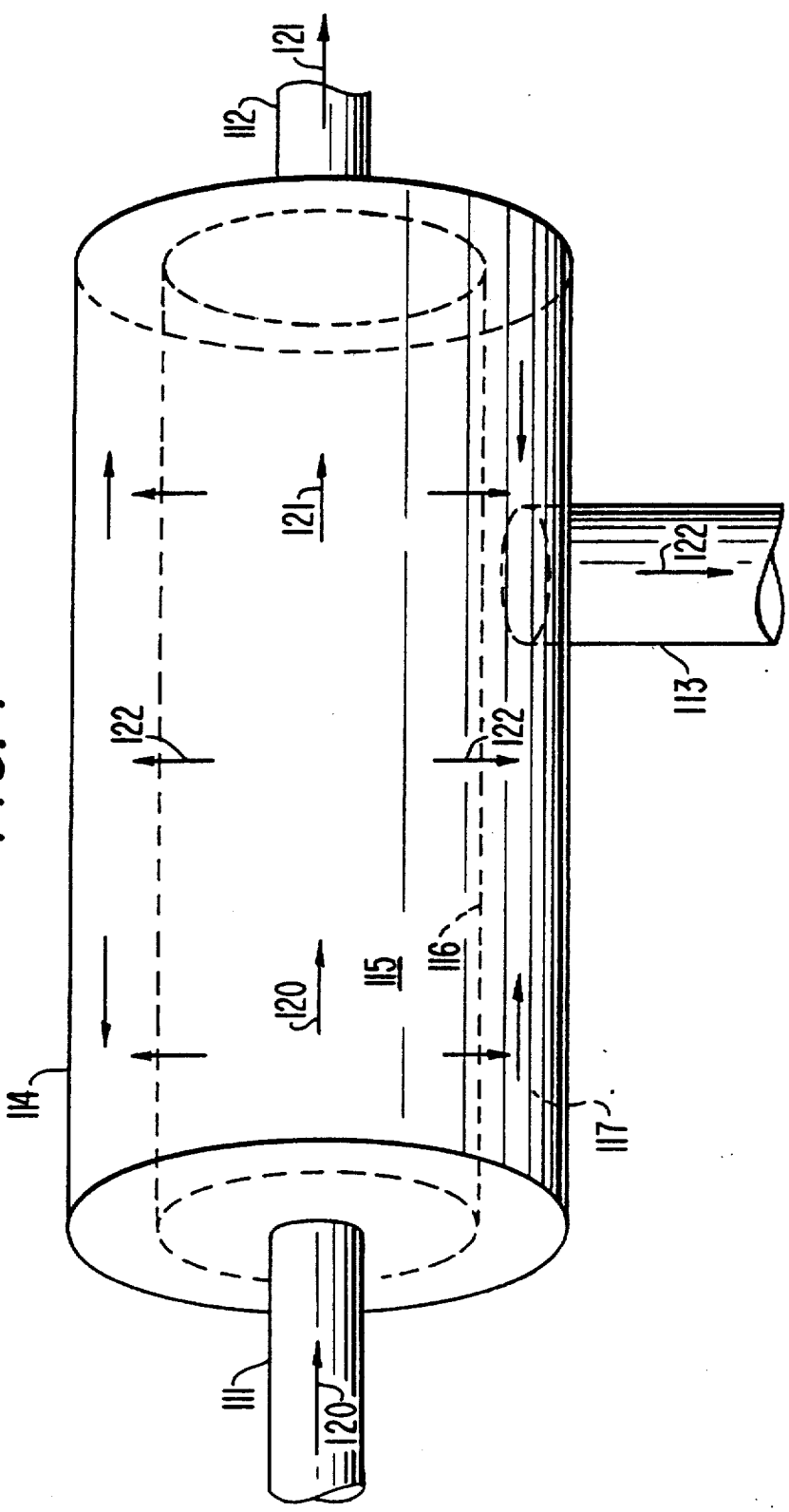
FIG. 4 is a perspective view of an individual crossflow filtration module used in the assembly of FIG. 3.

As shown in FIG. 4, each crossflow filtration module 110 preferably comprises a generally tubular outer casing 114, with inlet 111 and first outlet 112 disposed in generally axial alignment at respective ends of casing 114. Inlet 111 and first outlet 112 are connected by axial first channel 115, which provides a flowpath. First channel 115 is defined by generally tubular semipermeable membrane 116, disposed coaxially in outer casing 114. Depending on the components to be filtered, semipermeable membrane 16 may be a microfilter, a macrofilter, an ultrafilter, or a hyperfilter. A second channel 117, is defined by a space between outer casing 114 and semipermeable membrane 116. Second channel 117 communicates to second outlet 113. Second outlet 113 projects radially from a side wall of outer casing 114. As shown in FIG. 3, second outlet 113 feeds product line 118. Product line 118 includes a throttle valve 119 for controlling the flow of second components 122 discharged from module 110.

Crossflow filtration module 110 works in the following manner. Influent solution 120, including at least a first set of components 121 having a given physical size, and a second set of components 122 having a physical size smaller than the size of the first set of components 121, enter crossflow filtration module 110 through inlet 111 to flow through first channel 115. As solution 120 passes across the surface of semipermeable membrane 116, second components 122 pass through semipermeable membrane 116 into second channel 117. Second components 122 are discharged through second outlet 113. Meanwhile, first components 121, being too large to penetrate semipermeable membrane 116, proceed to first outlet 112, where they are discharged from module 110.

In accordance with the invention, the crossflow filtration assembly includes means for introducing the solution into the series-connected filtration means at each inlet to mix with the first set of components discharged from the preceding first outlet. As embodied in FIG. 3, the means for introducing the solution includes a system supply line 130, a supply pump 132, and a supply line 131 having a number of branches corresponding to the number of crossflow filtration modules 110. Supply pump 132 may be, for example, a centrifugal pump or a positive displacement pump. Each branch of supply line 131 includes a respective throttle valve 133 for controlling influent solution supply flow. Each branch of supply line 131 connects to an inlet 111 of a respective crossflow filtration module 110. Thus, additional influent solution 120 mixes with the first set of components 121 discharged from preceding crossflow filtration module first outlet 112, prior to entering succeeding crossflow filtration module inlet 111. Each branch of supply line 131 preferably includes a check valve 134, allowing flow in a direction from supply pump 132 to crossflow filtration module inlet 111, but preventing any backflow of combined influent solution 120 and first components 121 in case of decreased head from supply pump 132.

In accordance with the invention, there is provided a means for circulating the solution and the first set of components in the series-connected filtration means. As embodied in FIG. 3, the means for circulating includes at least one circulating pump 140, which may be for example a centrifugal pump or a positive displacement pump. Circulating pump 140 preferably is disposed immediately downstream of first outlet 112 of one of the crossflow filtration modules 110. A discharge line 141 of pump 140 connects to inlet 111 of a succeeding crossflow filtration module 110. Intermediate this point, discharge line 141 is intersected by a branch of supply line 131, so that mixing of first set of components 121 pumped from preceding crossflow filtration module 110, with additional influent solution 120 can take place.

Figure 5:
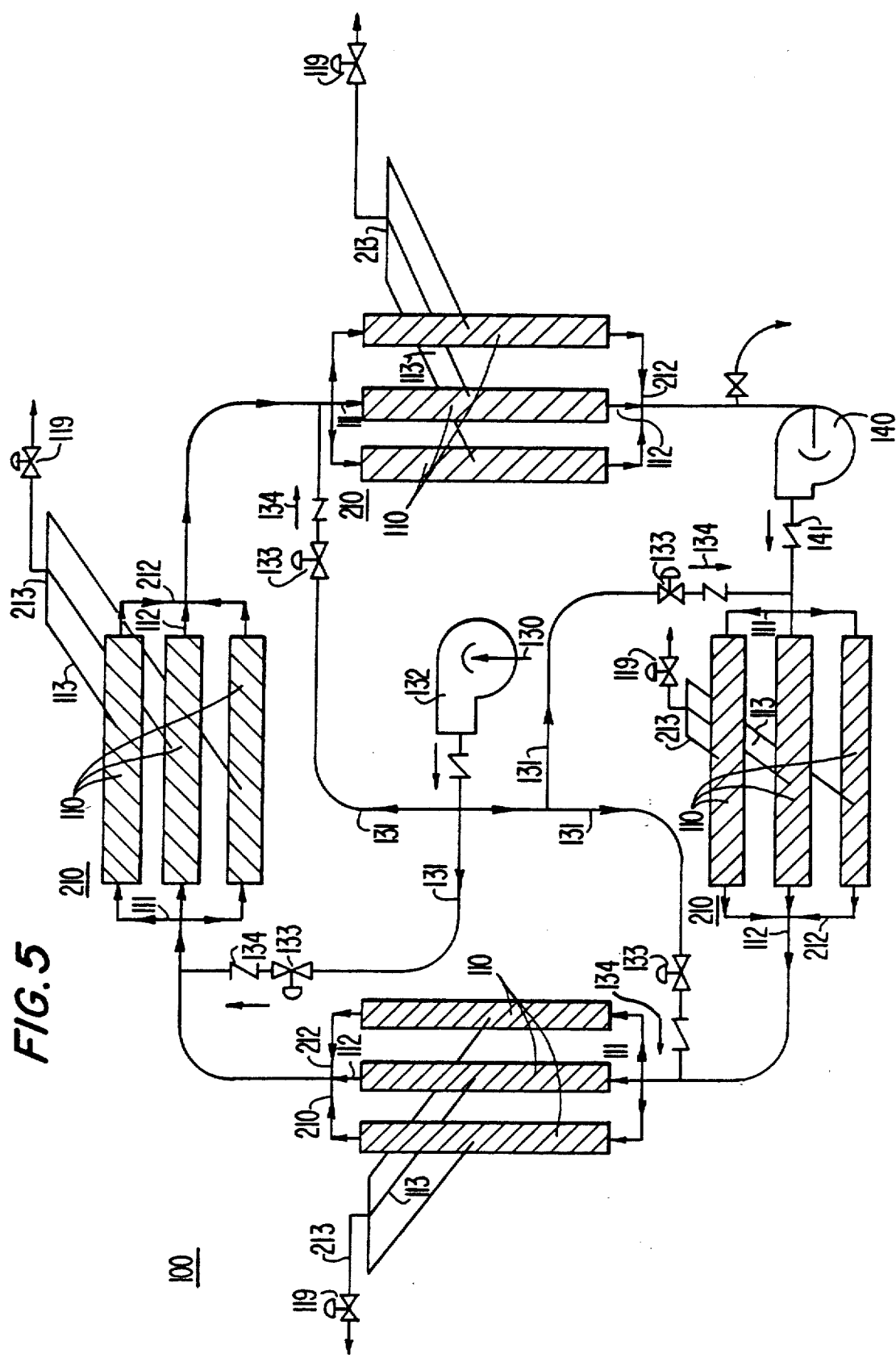
FIG. 5 is a schematic diagram of a second embodiment of a serial crossflow filtration assembly in accordance with the present invention.

A second preferred embodiment of the crossflow filtration assembly is shown in FIG. 5.

The invention further includes discharge means. The discharge means includes a discharge pipe. As embodied in FIG. 3, discharge pipe 170 branches off first outlet 112 of one module 110. Discharge pipe 170 enables large components 121 to be discharged from the assembly at desired intervals.

According to this aspect of the present invention, each of the crossflow filtration means which are connected in series includes a plurality of crossflow filtration modules arranged in parallel to one another. As shown in FIG. 5, each crossflow filtration means includes a plurality of crossflow filtration modules 110, each including an inlet 111, first outlet 112, and second outlet 113. Preferably, modules 110 are arranged in clusters of modules 210, each module 110 in the cluster disposed in parallel to one another, the clusters 210 then connected in series, having a length of piping between each first outlet 112 and the succeeding inlet 111.

Preferably, each crossflow filtration module 110 in cluster 210 contains identical components and functions exactly the same as crossflow filtration modules 110 in the first embodiment, with the exception that parallel first outlets 112 discharge to a common brine line 212, and second outlets 113 discharge to a common product line 213.

The configuration of the crossflow filtration assembly of the present invention is not limited to the preferred embodiments disclosed. For example, circulation means may include a plurality of pumps 140, disposed between succeeding modules 110 or module cluster 210. Pumps 140 may include booster pumps 142 (not shown), as required.

In another variation of the preferred embodiments, first channel 115 of crossflow filtration module 110 may comprise a plurality of tubular parallel channels, each defined by a semipermeable membrane 116 configured to pass second set of components 122, while preventing passage of first set of components 121.

In accordance with the invention, and referring to FIG. 3, the crossflow filtration assembly operates to filter a first set of components and a second set of components in the following manner.

Influent solution 120 is supplied to the assembly by supply pump 132 through branches of supply line 131, to a line immediately upstream of inlet 111 of each module 110. Passing through each crossflow filtration module 110, solution 120 is separated into a first set of components 121 which are larger in size and a second set of components 122 which are smaller in size. Second set of components 122 exit crossflow filtration module 110 via second outlet 113 to product line 118 and depart the system.

Meanwhile, first set of components 121 exit crossflow filtration module 110 via first outlet 112, and proceed to the inlet 111 of the succeeding series-connected crossflow filtration module 110. Prior to entering the next crossflow filtration module 110 in the series, additional solution 120 is mixed in by supply line 131 to dilute the concentration of the first set of components 121. The mixture of additional solution 120 and first set of components 121 is then circulated through the next filtration module 110 in the system by head supplied by pump 140.

Continuous circulation through series-connected crossflow filtration modules 110 of the present invention, and continual redilution of the filtered first set of components 121 by additional influent solution 120, prevents first set of components 121 from increasing in concentration to the point where flow through the crossflow filtration modules 110 is restricted or obstructed. This effect is achieved without a significant increase in capacity or horsepower of circulating pump 140, or significant increase in the size of system piping.

Experiments using the crossflow filtration assembly will produce the following results.

Experiment No. 1

Figure 6:
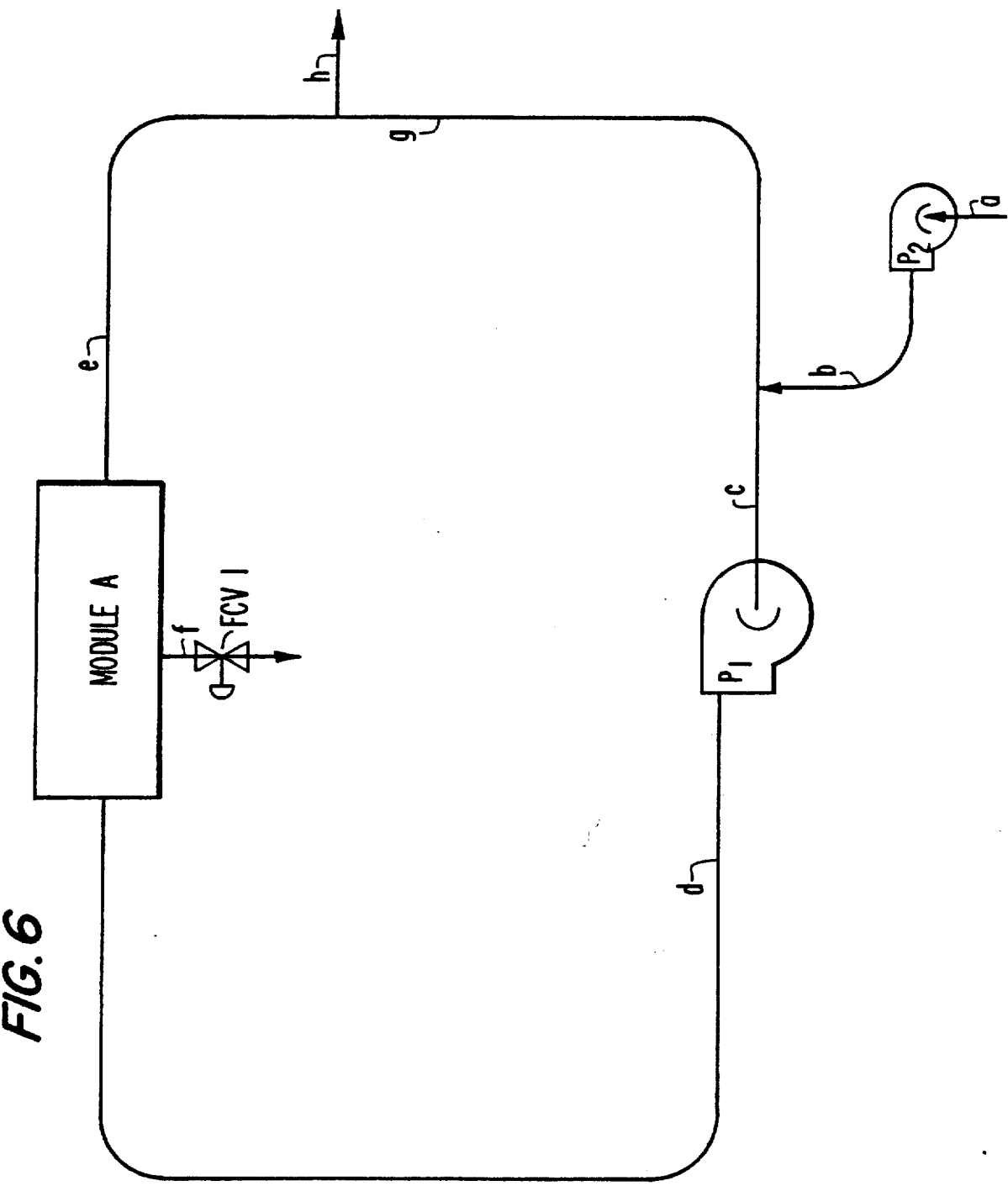
FIG. 6 is a schematic diagram of a first experimental application using a conventional crossflow filtration assembly.

In the first experiment, a conventional crossflow filtration assembly as shown in FIG. 6 is used. Measurements taken at various points in the system shown in the drawing, will demonstrate reduced flow rate in the system downstream of the module produced by clogging of the larger components therein.

| Module A | 800 × ¼" tubes @ 155 gpm |
|---|---|
| Pump P1 | 919 gpm @ 34' TDH, 15 HP |
| Pump P2 | 217 gpm @ 84' TDH, 10 HP |
| Line a | 4" dia. @ 217 gpm |
| Line b | 3" dia. @ 217 gpm |
| Line c | 8" dia. @ 919 gpm |
| Line d | 6" dia. @ 919 gpm |
| Line e | 8" dia. @ 764 gpm |
| Line f | 5" dia. @ 155 gpm |
| Line g | 8" dia. @ 702 gpm |
| Line h | 3" dia. @ 62 gpm |
| fcv1 | 6" dia. @ 155 gpm |

Experiment No. 2

Figure 7:
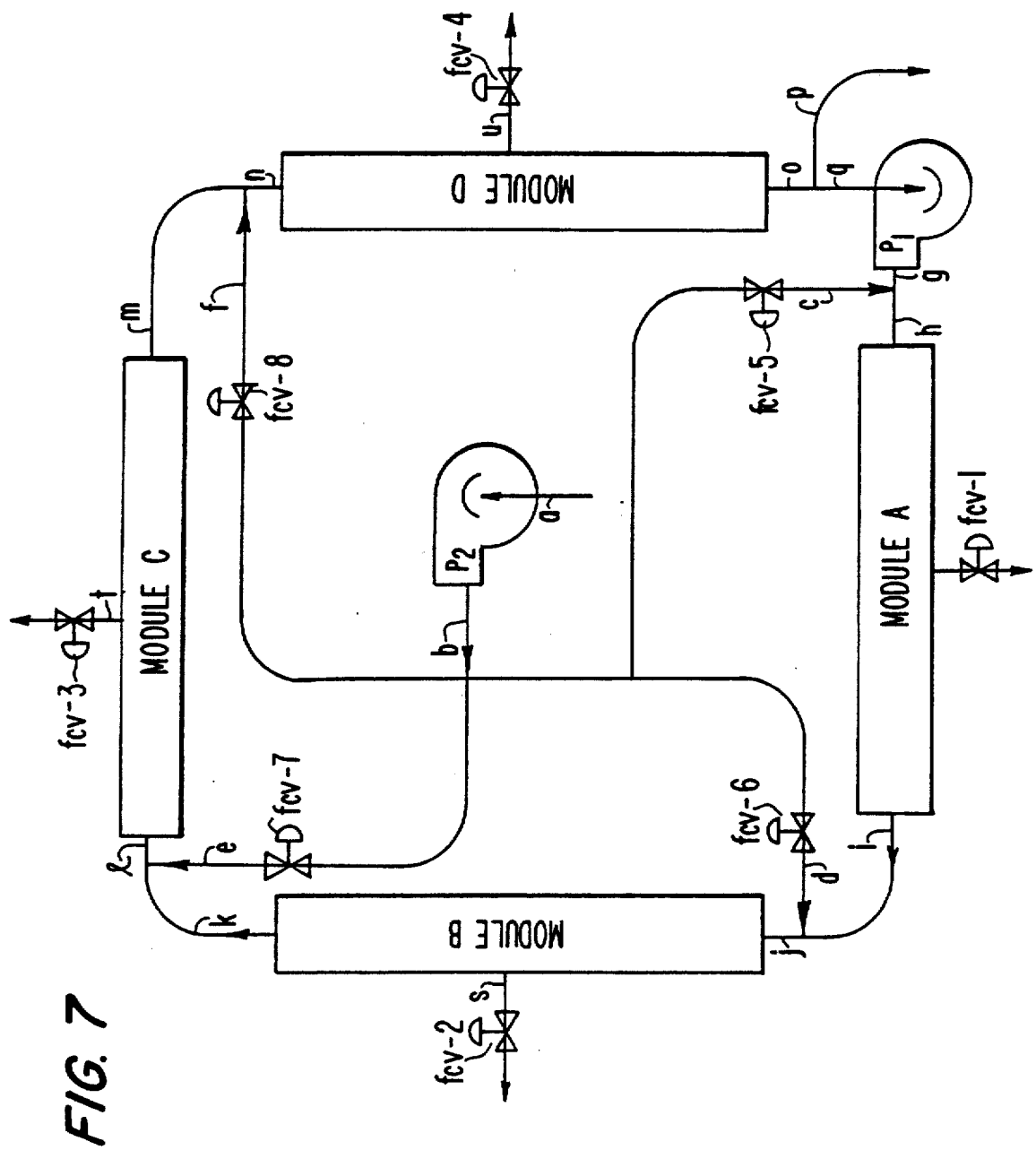
FIG. 7 is a schematic diagram of a second experimental application using a serial crossflow filtration assembly in accordance with the present invention.

In the second experiment, a serial crossflow microfiltration assembly in accordance with the present invention as shown in FIG. 7 is used. Measurements taken at various points in the system will indicate a substantially increased flow rate from that experienced in the previous experiment using the conventional filtration assembly. This effect will illustrate the reduced level of obstruction in the modules. Further this effect is achieved without increase in the capacity or horsepower of the pumps, or increase in size of the system piping.

| Module A | 200 × ¼" dia. tube - 39 gpm |
|---|---|
| Module B | 200 × ¼" dia. tube - 39 gpm |
| Module C | 200 × ¼" dia. tube - 39 gpm |
| Module D | 200 × ¼" dia. tube - 39 gpm |
| Pump 1 | 175 gpm @ 60' TDH, 5 HP |
| Pump 2 | 217 gpm @ 84' TDH, 10 HP |
| fcv 1-4 | 3" dia. @ 39 gpm |
| fcv 5-8 | 1¼" dia. @ 54 gpm |
| Line a | 4" dia. @ 217 gpm |

| -continued | |
|---|---|
| Line b | 3" dia. @ 217 gpm |
| Line c | 1¼" dia. @ 54 gpm |
| Line d | 1¼" dia. @ 54 gpm |
| Line e | 1¼" dia. @ 54 gpm |
| Line f | 1¼" dia. @ 54 gpm |
| Line g | 3" dia. @ 175 gpm |
| Line h | 3" dia. @ 229 gpm |
| Line i | 3" dia. @ 190 gpm |
| Line j | 3" dia. @ 244 gpm |
| Line k | 3" dia. @ 205 gpm |
| Line l | 3" dia. @ 260 gpm |
| Line m | 3" dia. @ 221 gpm |
| Line n | 3" dia. @ 276 gpm |
| Line o | 4" dia. @ 237 gpm |
| Line p | 3" dia. @ 62 gpm |
| Line q | 4" dia. @ 175 gpm |
| Line r | 3" dia. @ 39 gpm |
| Line s | 3" dia. @ 39 gpm |
| Line t | 3" dia. @ 39 gpm |
| Line u | 3" dia. @ 39 gpm |

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the invention.

What is claimed is:

1. A crossflow filtration assembly, comprising:
   a plurality of crossflow filtration means for separating an influent solution into a first effluent solution including a first plurality of particulate components having a given physical size and a second effluent solution including a second plurality of particulate components having a physical size smaller than said first particulate components, each of the crossflow filtration means including an inlet, a first outlet discharging said first effluent solution, and a second outlet discharging said second effluent solution, the plurality of crossflow filtration means connected in a series configuration wherein each inlet is connected to the preceding first outlet;
   means for continuously introducing additional influent solution into the series-connected crossflow filtration means at each said inlet to mix with the first effluent solution discharged from the preceding first outlet and dilute a concentration of said first plurality of particulate components in said first effluent solution; and
   means for continuously circulating the mixed influent solution and diluted first effluent solution through the series-connected crossflow filtration means.

2. The assembly of claim 1, wherein each said crossflow filtration means includes a module having an internal first passage connecting the inlet and first outlet, defined by at least one generally tubular semipermeable membrane, and a second passage exterior to said membrane communicating to said second outlet.

3. The assembly of claim 2, wherein each said membrane is a microfilter.

4. The assembly of claim 2, wherein each said membrane is a macrofilter.

5. The assembly of claim 2, wherein each said membrane is an ultrafilter.

6. The assembly of claim 2, wherein each said membrane is a hyperfilter.

7. The assembly of claim 2, wherein the membrane includes passages having a dimension incapable of passing the first plurality of particulate components.

8. The assembly of claim 2, wherein the membrane includes passages having a dimension capable of passing the second plurality of particulate components.

9. The assembly of claim 1, wherein said means for introducing includes at least one pump having a discharge divided into a predetermined number of parallel introducing branches corresponding to the number of said crossflow filtration means inlets.

10. The assembly of claim 9, wherein each said introducing branch includes a means for throttling flow of said influent solution.

11. The assembly of claim 1, wherein said means for circulating includes at least one pump disposed between two of said crossflow filtration means, having a pump inlet connected to the first outlet of its preceding crossflow filtration means, and a pump discharge connected to the inlet of its succeeding crossflow filtration means.

12. The assembly of claim 1, wherein each of said second outlet includes a means for throttling flow of said second effluent solution discharged from said filtration means.

13. The assembly of claim 1, wherein the series configuration of the crossflow configuration means comprises a generally circular series configuration.

14. The assembly of claim 1, further including a discharge means for selectively discharging the first effluent solution from the assembly disposed downstream of at least one first outlet.

15. A crossflow filtration assembly comprising:
a plurality of crossflow filtration means for separating an influent solution into a first effluent solution including a first plurality of particulate components having a given physical size and a second effluent solution including a second plurality of particulate components having a physical size smaller than said first particulate components, each of the crossflow filtration means including a plurality of modules arranged in parallel to one another, each module including a module inlet, a first module outlet discharging the first effluent solution, and a second module outlet discharging the second effluent solution, said plurality of module inlets branching from a common inlet, said plurality of first module outlets combining as a first common outlet, and said plurality of second module outlets combining as a second common outlet, the plurality of crossflow filtration means connected in a series configuration wherein each common inlet is connected to the preceding first common outlet;

means for continuously introducing additional influent solution into the series-connected crossflow filtration means at each said common inlet to mix with the first effluent solution discharged from the preceding first common outlet and dilute a concentration of said first plurality of particulate components in said first effluent solution; and means for continuously circulating the mixed influent solution and diluted first effluent solution in the series-connected crossflow filtration means.

16. A method of filtering an influent solution into a first effluent solution including a first plurality of particulate components having a given physical size and a second effluent solution including a second plurality of particulate components having a physical size smaller than the first particulate components, comprising the steps of:

flowing the influent solution into the inlets of a plurality of series-connected crossflow filtration modules;

flowing the first effluent solution along the surface of a filtration membrane in each crossflow filtration module;

flowing the second effluent solution through the filtration membrane in each crossflow filtration module;

flowing the first effluent solution out of a first outlet in each crossflow filtration module, mixing and diluting said first effluent solution with additional influent solution, and flowing the mixed additional influent solution and diluted first effluent solution into the inlet of a succeeding series-connected crossflow filtration module; and discharging the second effluent solution from a second outlet in each crossflow filtration module.

* * * * *